Sept. 2, 1952  S. G. HARRIS  2,608,716
METHOD FOR RECOVERING OYSTERS
Filed June 28, 1950  2 SHEETS—SHEET 1
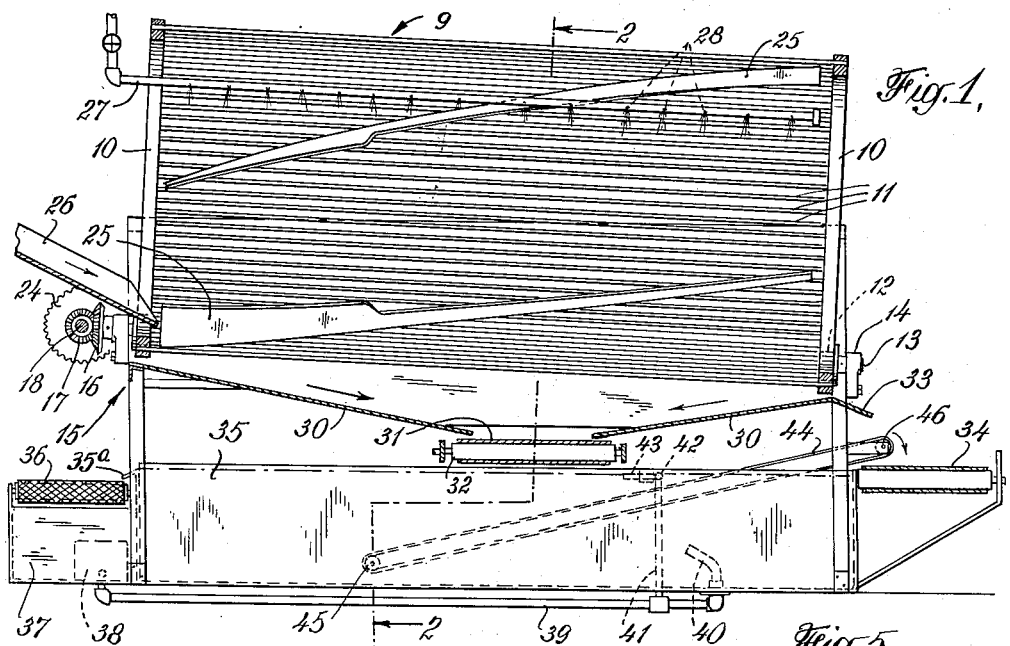
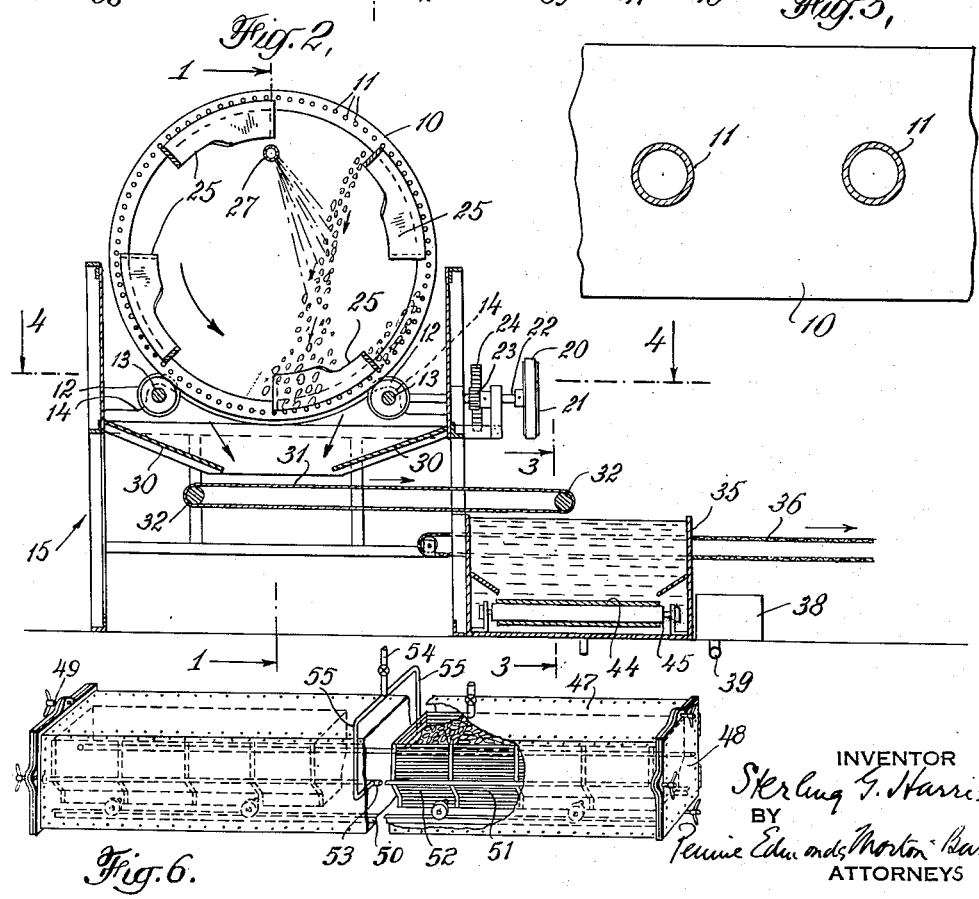
INVENTOR
Sterling G. Harris
BY
Pennie Edmonds Morton Barrows
ATTORNEYS Sept. 2, 1952          S. G. HARRIS          2,608,716
METHOD FOR RECOVERING OYSTERS
Filed June 28, 1950          2 SHEETS—SHEET 2
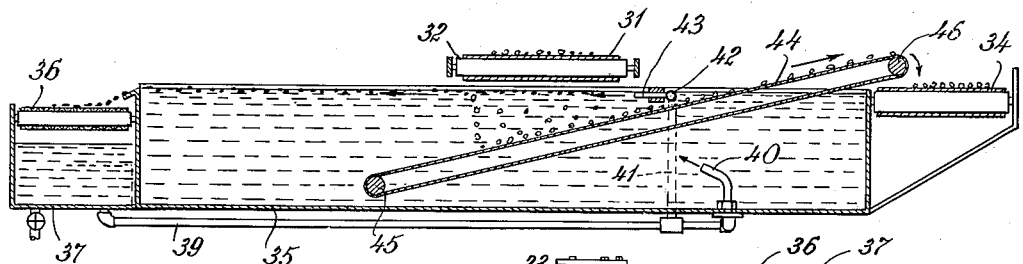
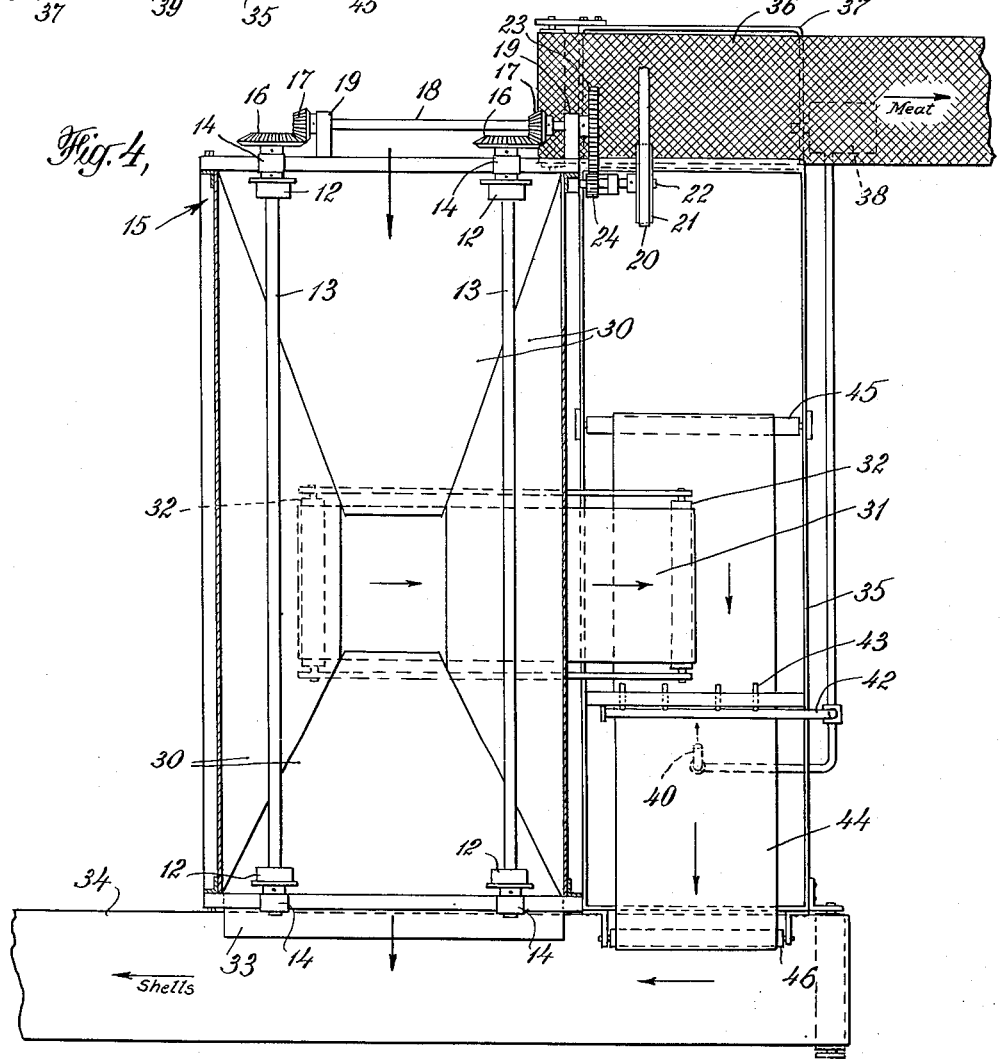
INVENTOR
Sterling S. Harris
BY
Pennie Edmonds Morton & Burrows
ATTORNEYS Patented Sept. 2, 1952

2,608,716

UNITED STATES PATENT OFFICE 2,608,716

METHOD FOR RECOVERING OYSTERS

Sterling G. Harris, Beaufort, S. C., assignor to The Blue Channel Corporation, Port Royal, S. C., a corporation of Maryland Application June 28, 1950, Serial No. 170,789

5 Claims. (Cl. 17—45)

This invention relates to the processing of oysters to prepare them for canning and is concerned more particularly with a novel method for recovering oyster meats from their shells.

Heretofore, in the canning of oysters, the usual preliminary operations have involved washing the oysters and then heating them in a steam box to cause the shells to open, after which shuckers pick the meats from the shells by hand. This method of extracting the oyster meats is slow, so that the output of a shucker is small, and, as labor costs have recently increased as a result of legislation, the cost of production has risen to the point where it is difficult to can oysters by present methods at a profit.

The present invention is, accordingly, directed to the provision of a novel method for recovering oyster meats from their shells, which can be carried on at low cost, in that, in the practice of the method, the oysters are handled in bulk, and the meats are separated from the shells mechanically and with little loss.

In recovering the oyster meats from their shells in accordance with the new method, the oysters as taken from the beds are washed and then steamed, as by being placed in wheeled receptacles, which are moved into a steam box. The steaming of the oysters is continued for a longer period and at a somewhat higher temperature than has heretofore been used, so that not only are the shells opened but also the adhesion of the meats to the shells is greatly weakened. After removal of the steamed oyster from the heating chamber, they are raised repeatedly to a considerable height and allowed to fall, while water jets at high pressure are directed against the falling oysters. The combined effect of the impact and the water jets on the oysters quickly frees the meats from the shells and the meats are carried away with the water, as they are released. The oyster meats together with any shell material carried off with them are then subjected to a flotation operation in a tank containing a salt solution of such salinity as to float the meats but not the shell material. The meats are carried out of the tank with the overflow and are ready for further processing treatments, while the shell material sinks to the bottom of the tank and is removed by appropriate means.

The operations of repeatedly subjecting the oysters to impact and the action of high pressure jets are advantageously carried on in an inclined rotating cylindrical drum having openings in its curved wall, through which the oyster meats may pass, while the shells are substantially all retained. The drum is provided with internal baffles, which are relatively wide for about one-third their length starting at the upper end of the drum and narrow elsewhere, and, as the steamed oysters enter the upper end of the drum, they are raised by the baffles nearly to the top of the drum and then allowed to fall and strike other oysters or the inner surface of the drum. The high pressure water jets are directed into that quadrant of the drum, from which the oysters are raised and into which they fall, and the major portion of the meats are released from the shells in the upper third of the drum by the action of the jets and the jarring, to which the oysters are subjected, while the remaining meats are recovered in the lower two-thirds of the drum. The water directed against the oysters leaves the drum through openings in the drum wall and carries the meats with it. The shells retained in the drum are raised and lowered a number of times to insure recovery of all the meats, and are then discharged from the lower end of the drum.

For a better understanding of the invention, reference may be made to the accompanying drawings, in which:

Fig. 1 is a view in vertical section on the line 1—1 of Fig. 2 of the preferred form of apparatus for practicing the new method;

Fig. 2 is a sectional view of the apparatus on the line 2—2 of Fig. 1;

Fig. 3 is a sectional view on the line 3—3 of Fig. 2;

Fig. 4 is a sectional view on the line 4—4 of Fig. 2 with the drum removed;

Fig. 5 is a fragmentary sectional view showing a pair of longitudinal members of the drum in full size and actual spacing; and Fig. 6 is a view in perspective of a suitable form of apparatus for steaming the oysters in the practice of the method of the application.

The apparatus illustrated in the drawings comprises a cylindrical drum 9 formed by end rings 10 connected by spaced longitudinal members, which may be pipes 11. The pipes 11 are spaced to permit oyster meats to pass between them, while substantially all the shells are held back, and a drum about 10' long and made up of end rings and ½" pipes spaced about 1⅝" has been found satisfactory. The drum is supported at a slight incline to the horizontal on flanged rollers 12, on which the end rings rest and which are fast on shafts 13. The shafts are supported at their opposite ends in bearings 14 on a framework 15 and each shaft has a bevel gear 16 at its upper end meshing with a like gear 17 on a shaft 18 mounted in bearings in brackets 19 on the framework. Shaft 18 is driven from a source of power by a belt 20 driving pulley 21 on a shaft 22, the shafts 18 and 22 being connected by gears 23 and 24 on the respective shafts.

A plurality of baffles 25 are secured to pipes 11 within the drum and extend helically from one end to the other. Each baffle is relatively wide for about a third its length starting at the upper end of the drum and is narrow for the rest of its length. The steamed oysters are fed into the upper end of the drum by means of a feed chute 26 and are immediately picked up by the wide portions of the baffles, raised to near the top of the drum, and then allowed to fall. A water pipe 27 extends lengthwise within the drum near its top and the pipe has a plurality of orifices 28 for directing jets of water upon the oysters, as they are raised by the baffles and released to drop to the bottom of the drum. The water is supplied to the pipe under pressure such that the combined action of the jets and the impact, to which the oysters are subjected, releases the meats from their shells. The greater part of the meats are freed in the upper third of the drum, but the impact and jet action continue during the travel of the oysters to the lower end of the drum to insure complete recovery of the meats.

The freed meats escape with the water through the openings between the pipes of the drum and the meats fall on pans 30 on the framework beneath the drum and are washed from the pans to a conveyor belt 31 trained over rollers 32. After repeated lifting and dropping, the shells are discharge upon an inclined plate 33, from which they fall upon a conveyor belt 34 to be carried to a disposal point.

The oyster meats, together with any shell material, which may have passed between the pipes of the drum, are discharged from conveyor belt 31 into a flotation tank 35 extending lengthwise of the drum at one side thereof and containing a brine of such salinity as to float the meats and permit the shell material to sink. The end wall of the tank adjacent the feed end of the drum is slightly lower than the other walls of the tank to provide an overflow 35a, which is directed upon a screen conveyor belt 36 overlying an overflow tank 37 for collecting the brine passing through the belt. A pump 38 connected to tank 37 withdraws brine from the tank and discharges the brine through a pipe 39 leading to one or more nozzles 40 within the flotation tank and through a branch 41 to a manifold 42 extending across tank 35 and provided with nozzles 43. Nozzles 40 and 43 lie beyond the conveyor belt 31 and discharge toward the overflow end of tank 35. Nozzle 40 lies well within the body of liquid in the tank and is directed slightly upwardly, while nozzles 43 are directed horizontally and lie just below the level of the liquid in tank 35. The liquid entering tank 35 through the nozzles, accordingly, causes a current in the tank, which carries the floating oyster meats rapidly to the overflow end of the tank.

An inclined conveyor belt 44 is trained about a roller 45 mounted between the walls of the flotation tank 35 and a roller 46 supported by the framework of the apparatus above the conveyor belt 34. Belt 44 lies within the flotation tank beneath the discharge end of belt 31 and is driven by any suitable means. Any shell material discharged with the oyster meats in tank 35 falls upon belt 44 and is carried out of the tank and deposited on shell conveyor belt 34 to be carried away with the shells discharged from the drum.

The apparatus for steaming the oysters illustrated in Fig. 6 is a conventional steam box 47, which is rectangular in section and is closed at its ends by hinged doors 48 provided with clamps 49, by which the doors may be held tightly in place to seal the box. The floor of the box is provided with rails 50, on which wheeled cars 51 having a body made of spaced slats 52 may be run into and out of the box. Perforated steam pipes 53 are mounted inside the box on the side walls to extend from end to end of the box and steam is supplied to the pipes from a main 54 having branches 55 leading through the side walls to the respective pipes.

In the practice of the method by the apparatus described, the oysters in the shell are preliminarily washed and then loaded into cars 51, which are run into the steam box. The box doors are then closed and clamped and steam is admitted into the box. The oysters are steamed for 9 minutes at a temperature of 240° F. Heretofore, the common practice has been to steam the oysters for 8 minutes at a temperature somewhat below 240° F. and down to 230° F. The steaming for the additional period at the higher temperature not only results in the opening of all the shells but also causes the adhesion of the meats to the shells to be weakened, so that recovery of the meats is facilitated. In the lift- and dropping of the oysters in bulk, while they are subjected to the action of the water jets, the meats freed from the shells quickly pass out of the mass of shells, so that there is little likelihood of damage being done to the meats.

A drum found to be satisfactory for carrying on the operations of lifting and dropping the steamed oysters, while they are acted on by the high pressure jets, is about 10' long, 4' in diameter and has a pitch of about 1" per 3' of length. The drum is rotated at about 20–22 R. P. M. In a drum of the construction described, the shells remain within the drum long enough to insure the recovery of practically all the meats and few shells escape between the longitudinal members of the drum. If the pitch is increased, the shells issue so rapidly from the lower end of the drum that some meats may be carried with them, while a decrease in the pitch increases the number of shells, which escape from the drum with the meats.

The several conveyor belts of the apparatus are driven by any suitable means and operate without attention to deliver the meats and shell material to the flotation tank, to remove the shell material from the tank, to carry away the shells, and to carry away the meats. The brine overflow is collected in the overflow tank and returned by the pump to the flotation tank, so that the flotation operation is carried out automatically. The conveyor belt 36, on which the meats are deposited, travels slowly and may serve as an inspection table, if desired.

I claim:

1. A method of recovering meats from shell oysters, which comprises steaming the oysters at a temperature and for a time sufficient to cause the shells to open and the adhesion of the meats to the shells to be weakened, repeatedly raising the steamed oysters in bulk to a substantial height and allowing them to fall, while directing jets of water under high pressure upon the falling oysters, and removing the meats, as soon as they are released, from the mass of shells being raised and dropped.

2. A method of recovering meats from shell oysters, which comprises steaming the oysters at a temperature and for a time sufficient to cause the shells to open and the adhesion of the meats to the shells to be weakened, repeatedly raising the steamed oysters in bulk to a substantial height and allowing them to fall, while directing jets of water under high pressure upon the falling oysters, and washing the meats, as soon as they are released and by means of the water from the jets, from the mass of shells being raised and dropped.

3. A method of recovering meats from shell oysters, which comprises steaming the oysters at a temperature and for a time sufficient to cause the shells to open and the adhesion of the meats to the shells to be weakened, causing the steamed oysters in bulk to travel along a downwardly inclined path, repeatedly raising the oysters traveling along the path to a substantial height and allowing them to fall, while directing jets of water under high pressure upon the falling oysters, removing the meats, as soon as they are released, from said path of travel laterally thereof, and discharging the empty shells at the lower end of the path.

4. A method of recovering meats from shell oysters, which comprises steaming the oysters at a temperature and for a time sufficient to cause the shells to open and the adhesion of the meats to the shells to be weakened, passing the steamed oysters in bulk through a zone and, during their passage through the zone, repeatedly raising the oysters to a substantial height and allowing them to fall, while directing jets of water under high pressure upon the falling oysters, removing the meats, as soon as they are released from the shells, through the side of the zone, and discharging the empty shells at the end of the zone.

5. A method of recovering meats from shell oysters, which comprises steaming the oysters at a temperature and for a time sufficient to cause the shells to open and the adhesion of the meats to the shells to be weakened, repeatedly raising the steamed oysters in bulk to a substantial height and allowing them to fall, while directing jets of water under high pressure upon the falling oysters, removing the meats, as soon as they are released, from the mass of shells being raised and dropped, and subjecting the meats and any shell material escaping with the meats from the mass of shells being raised and dropped to a flotation operation to separate the meats and shell material.

STERLING G. HARRIS.

REFERENCES CITED

The following references are of record in the file of this patent:

UNITED STATES PATENTS

| Number | Name | Date |
|---|---|---|
| 1,200,351 | Heyser | Oct. 3, 1916 |
| 2,008,820 | Doxsee, Jr. et al. | July 23, 1935 |
| 2,047,688 | Jenkins | July 14, 1936 |
| 2,102,943 | Cook | Dec. 21, 1937 |
| 2,102,945 | Doxsee, Jr. et al. | Dec. 21, 1937 |